(12) United States Patent
Jensen

(10) Patent No.: US 9,084,461 B2
(45) Date of Patent: Jul. 21, 2015

(54) PROTECTIVE CASES FOR MOBILE ELECTRONIC DEVICES AND RELATED METHODS

(75) Inventor: Gentry Jensen, Farmington, UT (US)

(73) Assignee: INVISIBLE GADGET GUARD, INC., North Salt Lake, UT (US)

( * ) Notice: Subject to any disclaimer, the term of this patent is extended or adjusted under 35 U.S.C. 154(b) by 537 days.

(21) Appl. No.: 13/397,201

(22) Filed: Feb. 15, 2012

(65) Prior Publication Data
US 2013/0206633 A1 Aug. 15, 2013

(51) Int. Cl.
*B23P 11/02* (2006.01)
*A45C 11/00* (2006.01)
*G06F 3/02* (2006.01)

(52) U.S. Cl.
CPC ........... *A45C 11/00* (2013.01); *A45C 2011/002* (2013.01); *G06F 3/0202* (2013.01); *Y10T 29/49876* (2015.01)

(58) Field of Classification Search
CPC ............ A45C 2013/025; G06F 1/1628; G06F 3/0202
USPC ....................... 29/453, 428, 450; 53/461, 492; 206/305, 320, 1.5, 37; 220/4.28, 4.33, 220/4.34; 361/679.01, 679.55, 679.56, 725; 455/575.1, 575.6, 575.8; 493/51, 52, 493/84, 121
See application file for complete search history.

(56) References Cited

U.S. PATENT DOCUMENTS

| | | | | |
|---|---|---|---|---|
| 2,611,460 | A * | 9/1952 | Nash | 220/4.31 |
| 2,919,045 | A * | 12/1959 | Waugh et al. | 220/4.34 |
| 2,973,831 | A * | 3/1961 | Sprouse et al. | 55/491 |
| 3,845,601 | A * | 11/1974 | Kostecky | 52/290 |
| 4,471,159 | A * | 9/1984 | Frank, Jr. | 29/525 |
| 5,392,920 | A * | 2/1995 | Prete | 206/320 |
| 6,343,709 | B1 * | 2/2002 | DeForrest et al. | 220/4.33 |
| 7,850,390 | B2 * | 12/2010 | Lisbona | 220/668 |
| 8,051,980 | B2 * | 11/2011 | Tai et al. | 206/320 |
| 8,246,129 | B2 * | 8/2012 | Wang et al. | 312/332.1 |
| 8,640,867 | B2 * | 2/2014 | Szucs et al. | 206/320 |
| 8,640,868 | B2 * | 2/2014 | O'Dowd et al. | 206/320 |
| 2012/0138493 | A1 * | 6/2012 | Tung-Ke | 206/320 |

* cited by examiner

*Primary Examiner* — Luan K Bui
(74) *Attorney, Agent, or Firm* — Holland & Hart

(57) ABSTRACT

A protective case for a mobile electronic device may comprise a first frame member, a second frame member, and a first lap joint configured for joining the first frame member to the second member. An aperture may extend through the first lap joint and a pin may be sized and configured for positioning within the aperture and locking the lap joint together. Additionally, an elastic material may be sized and configured for positioning between the pin and a wall defining a portion of the aperture, the elastic material being elastically compressed between the wall and the pin when the pin is positioned within the aperture.

7 Claims, 5 Drawing Sheets

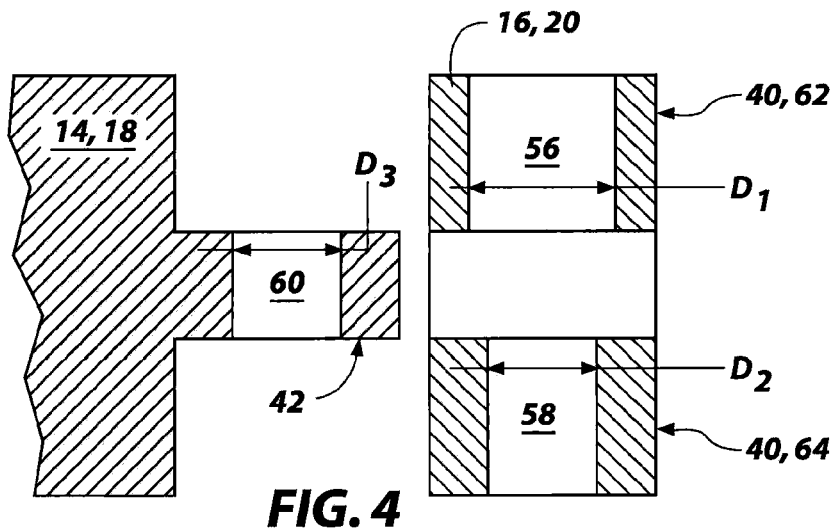
FIG. 4
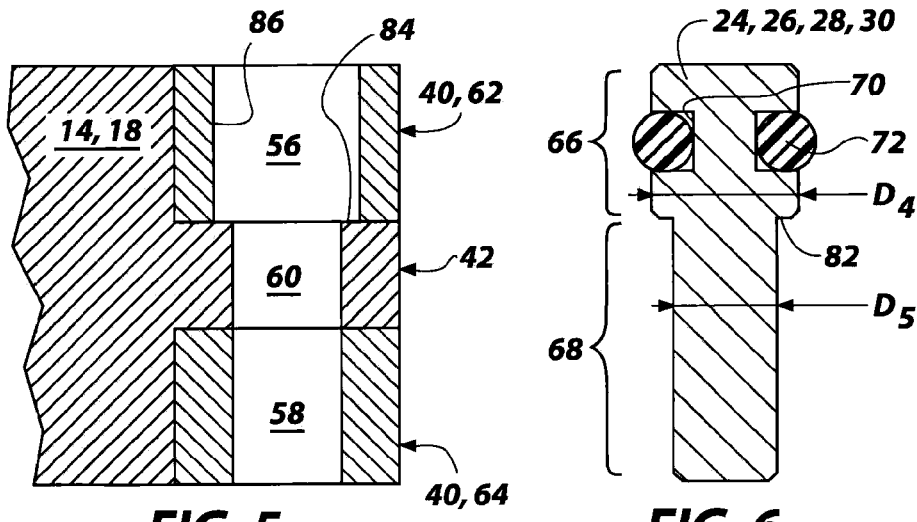
FIG. 5
FIG. 6
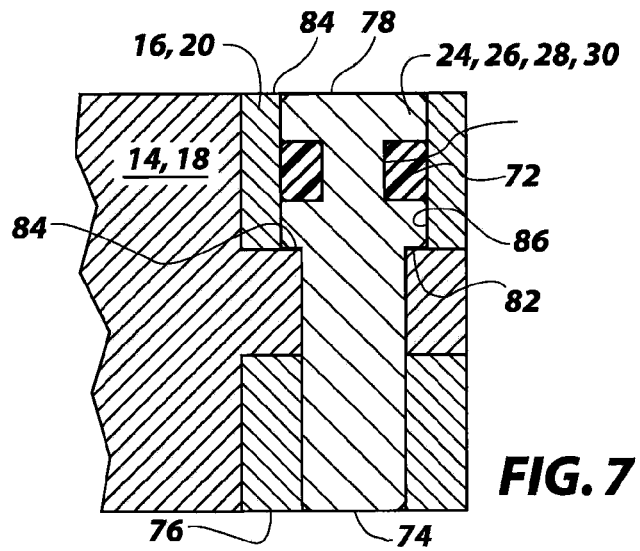
FIG. 7

PROTECTIVE CASES FOR MOBILE ELECTRONIC DEVICES AND RELATED METHODS

BACKGROUND

Mobile electronic devices may be subject to impacts during the use and/or transport thereof. For example, a mobile electronic device may be accidentally dropped, or may be placed in a bag where other objects may impact the portable electronic device while the bag is being carried by a user. Accordingly, it may be desirable to protect a mobile electronic device from damage that may result from such impacts by installing a protective case on the mobile electronic device.

A protective case may protect a mobile electronic device from damage as a result of certain impacts, but having a protective cover installed on a portable electronic device may prevent access to certain features of the mobile electronic device, such as a battery. Screws may be utilized to secure a protective case to a mobile electronic device. Screws, however, require a specialized tool, such as a screw driver or a hex wrench, for installation and removal. The requirement of a specialized tool for installation and removal of a protective case may be problematic. For example a user may be in a remote location without access to specialized tools and need to access the battery of the mobile electronic device for replacement or to reset the device after a malfunction, and the protective case may inhibit such access.

In view of the foregoing, improved protective cases for mobile electronic devices and improved methods of installing and removing such protective cases would be desirable.

SUMMARY

In some embodiments, a protective case for a mobile electronic device may comprise a first frame member, a second frame member, and a first lap joint configured for joining the first frame member to the second member. An aperture may extend through the first lap joint and a pin may be sized and configured for positioning within the aperture and locking the lap joint together. Additionally, an elastic material may be sized and configured for positioning between the pin and a wall defining a portion of the aperture, the elastic material being elastically compressed between the wall and the pin when the pin is positioned within the aperture.

In further embodiments, a method of providing a protective case for a mobile electronic device may comprise overlapping fingers extending from respective ends of a first frame member and a second frame member, and coaxially aligning apertures within the fingers. The method may further comprise applying an axial force to a first pin and pushing the first pin into the coaxially aligned apertures with the axial force, and compressing an elastic material between a wall of an aperture of the coaxially aligned apertures and the first pin.

In additional embodiments, a protective case for a mobile electronic device may comprise a plurality of elongate frame members, and a plurality of pins. Each of the plurality of elongate frame members may comprise a top rail, a bottom rail oriented substantially parallel to the top rail and joined to the top rail at a first end and an opposing second end, and at least one finger having an aperture therethrough extending from each of the first end and the opposing second end. Each pin of the plurality of pins may comprise a circumferentially extending recess having an elastic material positioned therein. The at least one finger extending from the first end of each elongate frame member of the plurality of elongate frame members may overlap the at least one finger extending from the second end of an adjacent elongate frame member of the plurality of frame members to form a lap joint connecting each elongate frame member to an adjacent elongate frame member of the plurality of elongate frame members to form a protective frame surrounding the mobile electronic device. Additionally, a pin of the plurality of pins may be positioned within each of the apertures of the fingers forming each lap joint, respectively, and the elastic material of each respective pin of the plurality of pins may be compressed to provide friction, which may hold each respective pin of the plurality of pins within the apertures of the fingers forming each respective lap joint.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a detailed cross-sectional view of fingers positioned at the ends of frame members of the protective case of FIG. 2.

FIG. 5 is a detailed cross-sectional view of the fingers of FIG. 4 aligned to form a lap joint.

FIG. 6 is a cross-sectional view of a pin of the protective case of FIG. 2.

FIG. 7 is a cross-sectional detail view of the pin of FIG. 6 positioned within the lap joint of FIG. 5.

Figure 1:
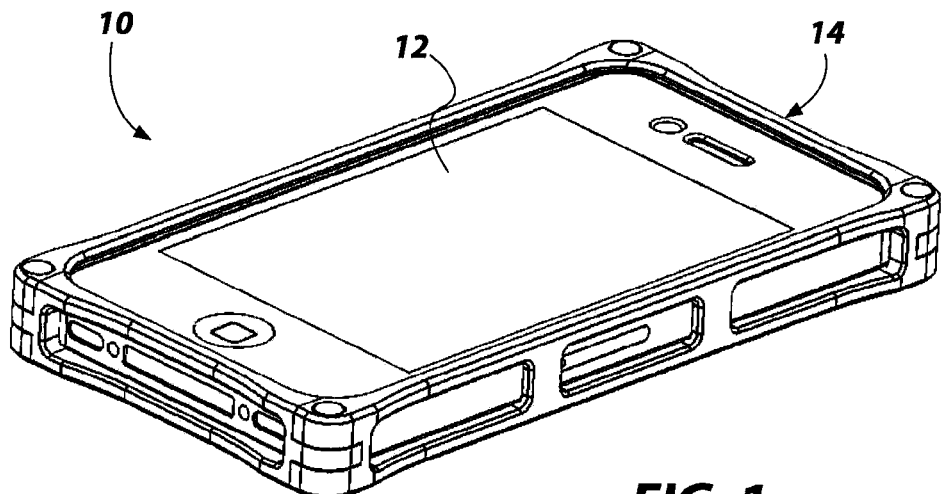
FIG. 1 is an isometric view of a protective case installed on a mobile electronic device, according to an embodiment of the present disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

In some embodiments, as shown in FIG. 1, an impact resistant mobile electronic device 10 may comprise a mobile electronic device 12 and a surrounding protective case 14. The mobile electronic device 12 may be a handheld electronic device, such as one or more of a cellular telephone, a handheld computer, a global positioning satellite (GPS) device, a personal digital assistant (PDA), a digital media player, a digital sound recorder, a digital video recorder, or a digital camera. For example, the mobile electronic device 12 may be a so-called "smart phone," such as the iPhone available from Apple Inc. of Cupertino, Calif.

Figure 2:
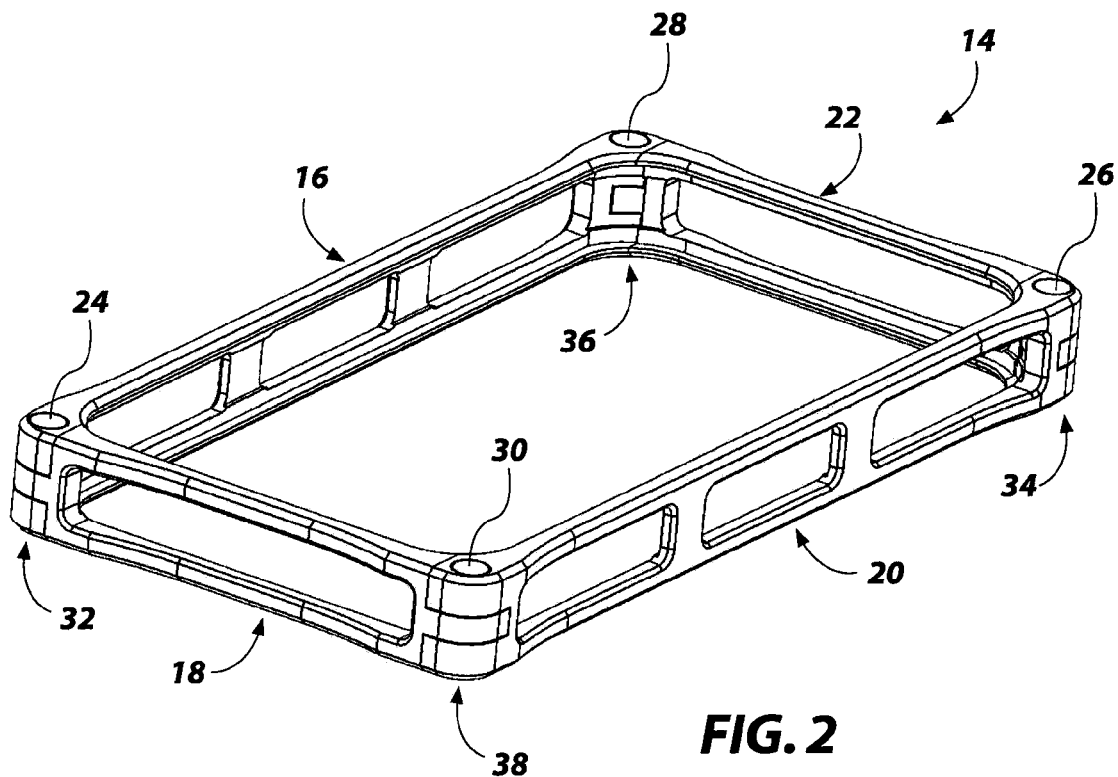
FIG. 2 is an isometric view of the protective case of FIG. 1, shown separately from the mobile electronic device.

The protective case 14, shown individually in FIG. 2, may comprise a plurality of frame members 16, 18, 20, 22 and a plurality of pins 24, 26, 28, 30 combining to form a frame-like structure. The plurality of frame members 16, 18, 20, 22 and the plurality of pins 24, 26, 28, 30 may be comprised of a rigid material, such as a metal or composite material, such as carbon fiber. For example, each frame member 16, 18, 20, 22 and each pin 24, 26, 28, 30 may be machined from an aluminum alloy, which may then be anodized, or molded from carbon fiber and resin. The plurality of frame members 16, 18, 20, 22 may comprise a first frame member 16, a second frame member 18, a third frame member 20, and a fourth frame member 22. Each frame member 16, 18, 20, 22 may be joined to each adjacent frame member 16, 18, 20, 22 by a lap joint 32, 34, 36, 38. Each lap joint 32, 34, 36, 38 may include overlapping fingers from adjacent frame members 16, 18, 20, 22. For example, each end of the first and third frame members 16, 20 may include two fingers 40 extending therefrom, the two fingers 40 defining a space therebetween. Additionally, each end of the second and fourth frame members 18, 22 may include a finger 42 extending therefrom. The finger 42 at each end of the second and fourth frame members 18, 22 may be sized and configured to fit within the space between the two fingers 40 at each end of the first and third frame members 16, 20 to form each lap joint 32, 34, 36, 38.

Figure 3:
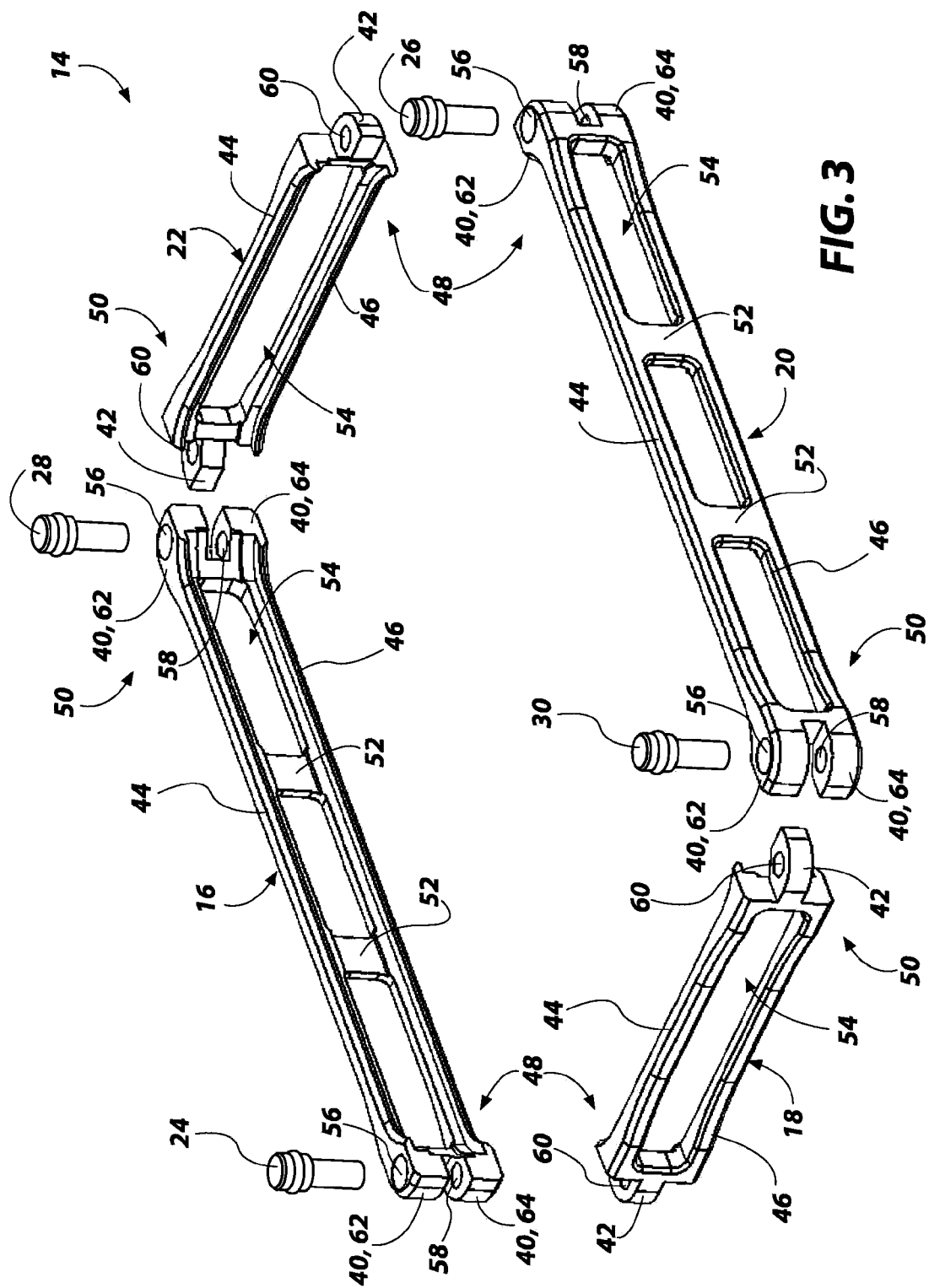
FIG. 3 is an exploded isometric view of the protective case of FIG. 2.

As shown in an exploded view in FIG. 3, each of the plurality of frame members 16, 18, 20, 22 may include a top rail 44 and a bottom rail 46 extending between the fingers 40, 42 located at each of a first end 48 and a second end 50 thereof. The top and bottom rails 44, 46 may be joined together at each end 48, 50. Longer frame members, such as the first and third frame members 16, 20 may additionally be joined together by one or more cross-braces 52. In view of this, the top and bottom rails 44, 46 may provide impact protection to the mobile electronic device 12 and openings 54 between the top and bottom rails 44, 46 may provide access to the sides of the mobile electronic device 12 while reducing the overall mass of each frame member 16, 18, 20, 22. Additionally, the openings 54 between the top and bottom rails 44, 46 of each frame member 16, 18, 20, 22 may be positioned to provide access to controls and features of the mobile electronic device 12, such as buttons, switches, adapters, microphones, speakers, inputs, and outputs.

Each finger 40, 42 of each frame member 16, 18, 20, 22 may include a respective aperture formed therethrough, such as a substantially cylindrical-shaped aperture, as shown in a cross-sectional detail view in FIG. 4. The apertures 56, 58 of each respective set of fingers 40 at each end 48, 50 of the first and third frame members 16, 20 may be coaxially aligned. Additionally, the aperture 60 of each finger 42 of the second and fourth frame members 18, 22 may be positioned to be coaxially aligned with the apertures 56, 58 of the respective fingers 40 of the first and third frame members 16, 20, when the fingers 40, 42 are aligned to form each lap joint 32, 34, 36, 38, as shown in a cross-sectional detail view in FIG. 5. The aperture 56 of a first finger 62 of the two fingers 40 at each end 48, 50 of the first and third frame members 16, 20 may be defined by a first diameter $D_1$ and the aperture of a second finger 64 may be defined by a second diameter $D_2$, the second diameter $D_2$ being smaller than the first diameter $D_1$. Additionally, the aperture 60 of the finger 42 at each end 48, 50 of the second and fourth frame members 18, 22 may be defined by a third diameter $D_3$, the third diameter $D_3$ being substantially the same as the second diameter $D_2$ of the second finger 64 at each end 48, 50 of the first and third frame members 16, 20.

Each pin 24, 26, 28, 30 may include a first axial region 66 and a second axial region 68 along its axial length, as shown in a cross-sectional detail view in FIG. 6. Each axial region 66, 68 may have a generally cylindrical shape, the first axial region 66 may have a first diameter $D_4$ and the second region 68 may have a second diameter $D_5$, and the second diameter $D_5$ may be smaller than the first diameter $D_4$. The first axial region 66 may include a circumferentially extending recess 70 and an elastic material may be positioned at least partially therein. For example, an O-ring 72 comprised on an elastomer (e.g., a rubber material) may be positioned within the recess 70, and a portion of the O-ring 72 may extend radially from the recess 70, as shown in FIG. 6. The second axial region 68 of each pin 24, 26, 28, 30 may be sized to fit within and substantially fill the aperture 58 of the second finger 64 at each end 48, 50 of the first and third frame members 16, 20 and the aperture 60 of the finger 42 at each end 48, 50 of the second and fourth frame members 18, 22, as shown in FIG. 7. Similarly, the first axial region 66 may be sized and configured to fit within the aperture 56 of the first finger 60 at each end 48, 50 of the first and third frame members 16, 20.

As shown in FIG. 7, when a pin 24, 26, 28, 30 is positioned within the apertures 56, 58, 60 of a respective lap joint 32, 34, 36, 38, a bottom surface 74 at an axial end of the pin 24, 26, 28, 30 may be substantially aligned with (e.g., coplanar to) a surface 76 of the bottom rail 46 and a top surface 78 at an opposing axial end of the pin 24, 26, 28, 30 may be substantially aligned with (e.g., coplanar to) a surface 80 of the top rail 44. Additionally, a radially extending surface 82 positioned between the first and second axial regions 66, 68 of the pin 24, 26, 28, 30 may be in direct contact with an upper surface 84 of a respective finger 42 of one of the second and fourth frame members 18, 22. In view of this, the upper surface 84 of each finger 42 of the second and fourth frame members 18, 22 may facilitate alignment of the top surface 78 of each pin 24, 26, 28, 30 with the surface 80 of each top rail 44 and alignment of the bottom surface 74 of each pin 24, 26, 28, 30 with the surface 76 of each bottom rail 46, and may prevent further insertion of each pin 24, 26, 28, 30 into the apertures 56, 58, 60 of each respective lap joint 32, 34, 36, 38. Additionally, each of the top surface 78 and the bottom surface 74 at the opposing axial ends of each pin 24, 26, 28, 30 may be substantially flat (i.e., planar) and may be substantially free of any surface protrusions or indentations, providing substantially smooth surfaces on the exterior of the protective case 14.

As the O-ring 72 positioned within the recess 70 of a pin 24, 26, 28, 30 may extend radially beyond the outer diameter $D_4$ of the pin 24, 26, 28, 30, when the O-ring 72 is in a relaxed state as shown in FIG. 6, the O-ring 72 may be compressed between the pin 24, 26, 28, 30 and a wall 86 of the aperture 56 of a respective first finger 60 when the pin 24, 26, 28, 30 is inserted into the apertures 56, 58, 60 of a lap joint 32, 34, 36, 38, as shown in FIG. 7. The compression of the O-ring 72 may secure the pin 24, 26, 28, 30 within the lap joint 32, 34, 36, 38 by providing sufficient friction between the pin 24, 26, 28, 30 and the aperture 56 of the lap joint 32, 34, 36, 38 to prevent unintended axial movement of the pin 24, 26, 28, 30 relative to the lap joint 32, 34, 36, 38. For example, the friction may overcome gravity and inertia forces and prevent the pin 24, 26, 28, 30 from moving relative to the lap joint 32, 34, 36, 38 during normal use of the portable electronic device 12.

In an embodiment of a method of installing the protective case 14, a mobile electronic device 12 may be surrounded by frame members 16, 18, 20, 22 of the protective case 14, the lap joints 32, 34, 36, 38 may each be assembled, and a pin 24, 26, 28, 30 may be inserted into each lap joint 32, 34, 36, 38. First, an elastic material may be positioned on each pin 32, 34, 36, 38. For example an elastomer O-ring 72 may be positioned within the circumferentially extending recess 70 of each pin 32, 34, 36, 38, as shown in FIG. 6.

Figure 10:
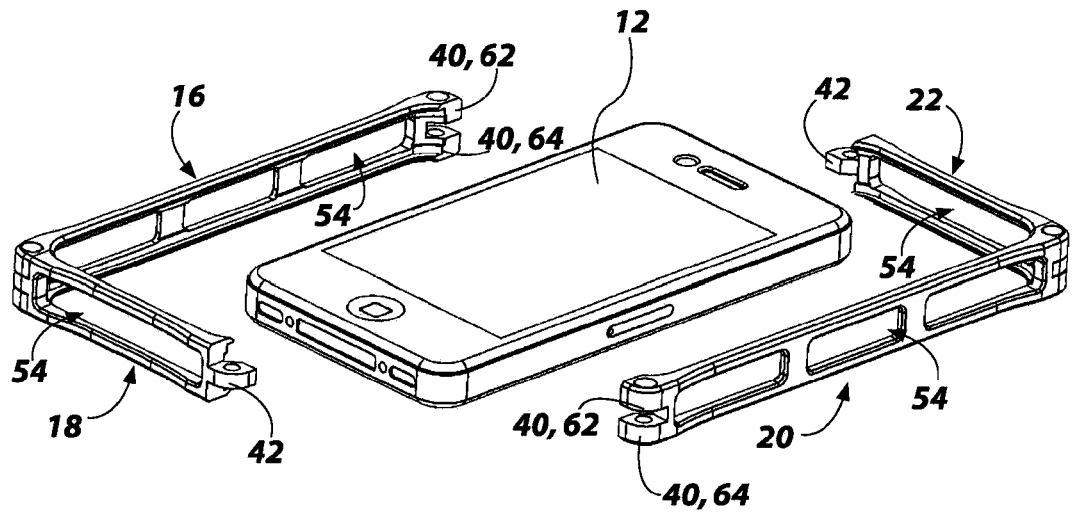
FIG. 10 is an isometric view of the first and second frame members coupled together and second and third frame members coupled together of the protective case of FIG. 2 with the mobile electronic device positioned therein.

Optionally, in some embodiments, the first frame member 16 may be coupled to the second frame member 18 and the third frame member 20 may be coupled to the fourth frame member 22 prior to positioning the frame members 16, 18, 20, 22 around the portable electronic device 8, as shown in FIG. 10.

Figure 8:
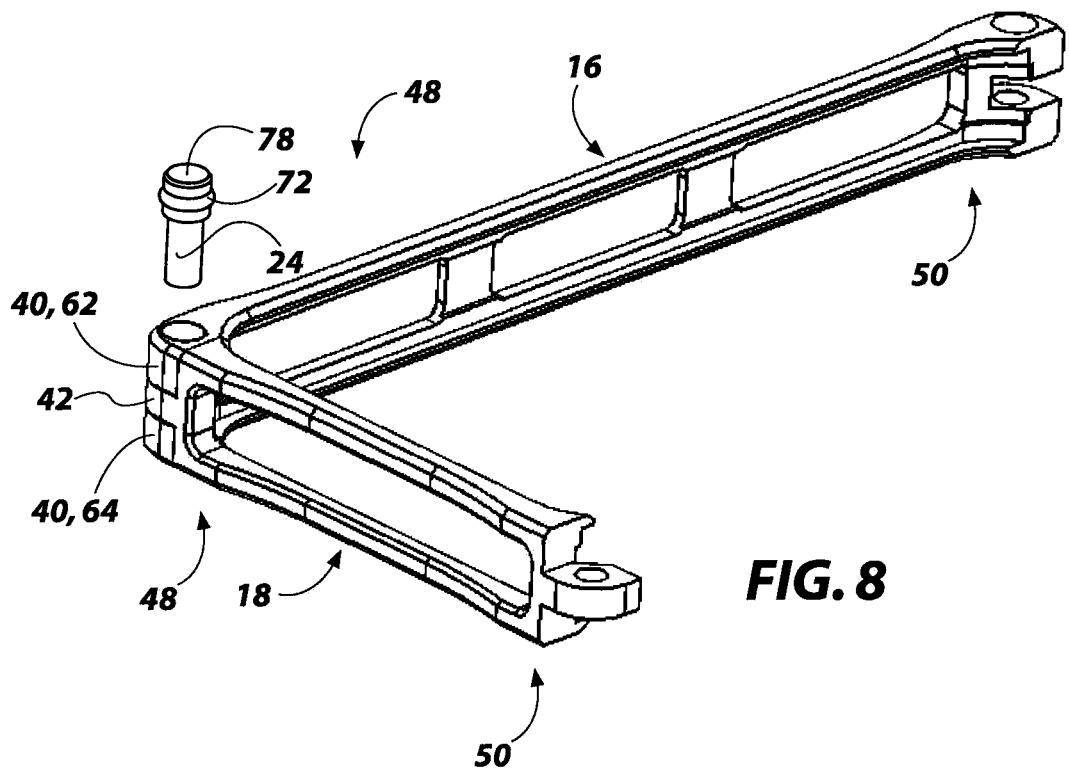
FIG. 8 is an isometric view of the first and second frame members of the protective case of FIG. 2 coupled together to form a first lap joint.

To join the first frame member 16 to the second frame member 18, the fingers 40 at the first end 48 of the first frame member 16 may be overlapped with the finger 42 extending from a first end 48 of the second frame member 18 and the apertures 56, 58, 60 within the fingers 40, 42 may be coaxially aligned to form a first lap joint 32, as shown in FIG. 8. The first pin 24 may then be coaxially aligned with the apertures 56, 58, 60 within the fingers 40, 42 and an axial force may be applied to the top surface 78 of the first pin 24 to push the first pin 24 into the coaxially aligned apertures 56, 58, 60 of the first lap joint 32 to lock the first lap joint 32 together. Because only an axial force is required, and no rotational force is required, to insert the first pin 24 into the coaxially aligned apertures 56, 58, 60 of the first lap joint 32, the first pin 24 may be manually inserted, such as by a user's finger tip, without the use of any tools. As the first pin 24 is inserted into the first lap joint 32, the O-ring 72 positioned within the circumferentially extending recess 70 of the first pin 24 may be compressed between the wall 86 of the aperture 56 and the circumferentially extending recess 70 of the first pin 24, as shown in FIG. 7. Upon complete insertion, the radially extending surface 82 between the first axial region 66 and the second axial region 68 of the first pin 24 may contact the upper surface 84 of the finger 42 of the second frame member 18, which may align the top surface 78 of the first pin 24 with the surface 80 of the top rail 44 first frame member 16 and align the bottom surface 74 of the first pin 24 with the surface 76 of the bottom rail 46 of the first frame member 16.

Figure 9:
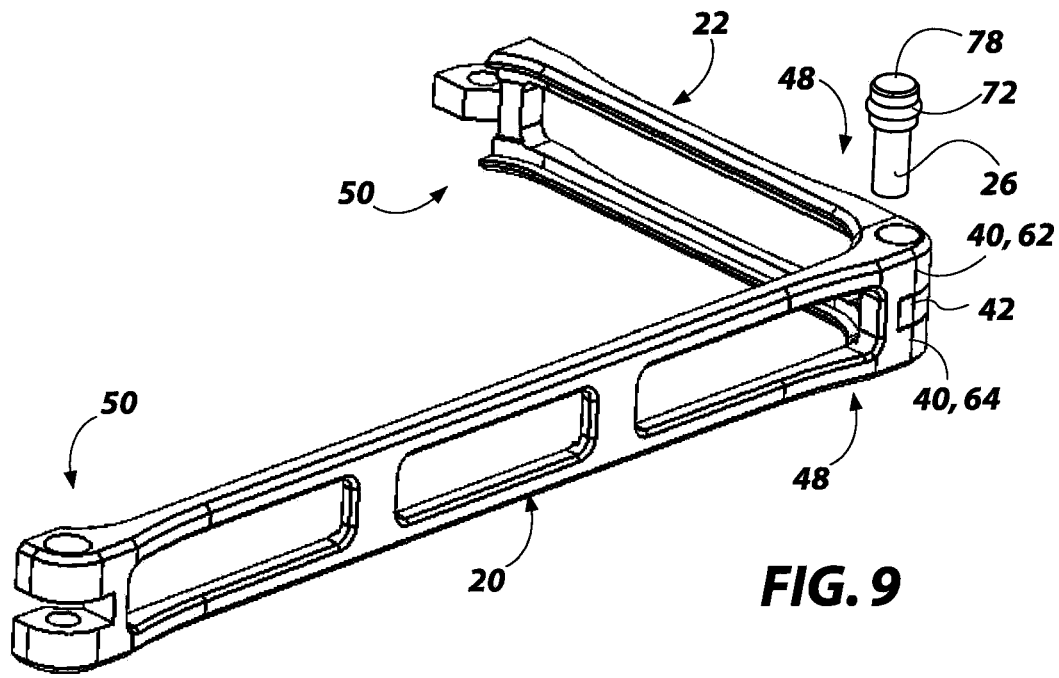
FIG. 9 is an isometric view of the third and fourth frame members of the protective case of FIG. 2 coupled together to form a second lap joint.

Similarly, the fingers 40 at a first end 48 of the third frame member 20 may be overlapped with the finger 42 extending from a first end 48 of the fourth frame member 22 and the apertures 56, 58, 60 within the fingers 40, 42 may be coaxially aligned to form a second lap joint 34, as shown in FIG. 9. The second pin 26 may then be coaxially aligned with the apertures 56, 58, 60 within the fingers 40, 42 and an axial force may be applied to the top surface 78 of the second pin 26 to push the second pin 26 into the coaxially aligned apertures 56, 58, 60 of the second lap joint 34 to lock the second lap joint 34 together. Because only an axial force is required, and no rotational force is required, to insert the second pin 26 into the second lap joint 34, the second pin 26 may be manually inserted, such as by a user's finger tip, without the use of any tools. As the second pin 26 is inserted into the into the second lap joint 34, the O-ring 72 positioned within the circumferentially extending recess 70 of the second pin 26 may be compressed between the wall 86 of the aperture 56 and the circumferentially extending recess 70 of the second pin 26, as shown in FIG. 7. Upon complete insertion, the radially extending surface 82 between the first axial region 66 and the second axial region 68 of the second pin 26 may contact the upper surface 84 of the finger 42 of the fourth frame member 22, which may align the top surface 78 of the second pin 26 with the surface 80 of the top rail 44 of the third frame member 20 and align the bottom surface 74 of the second pin 26 with the surface 76 of the bottom rail 46 of the third frame member 20.

Figure 11:
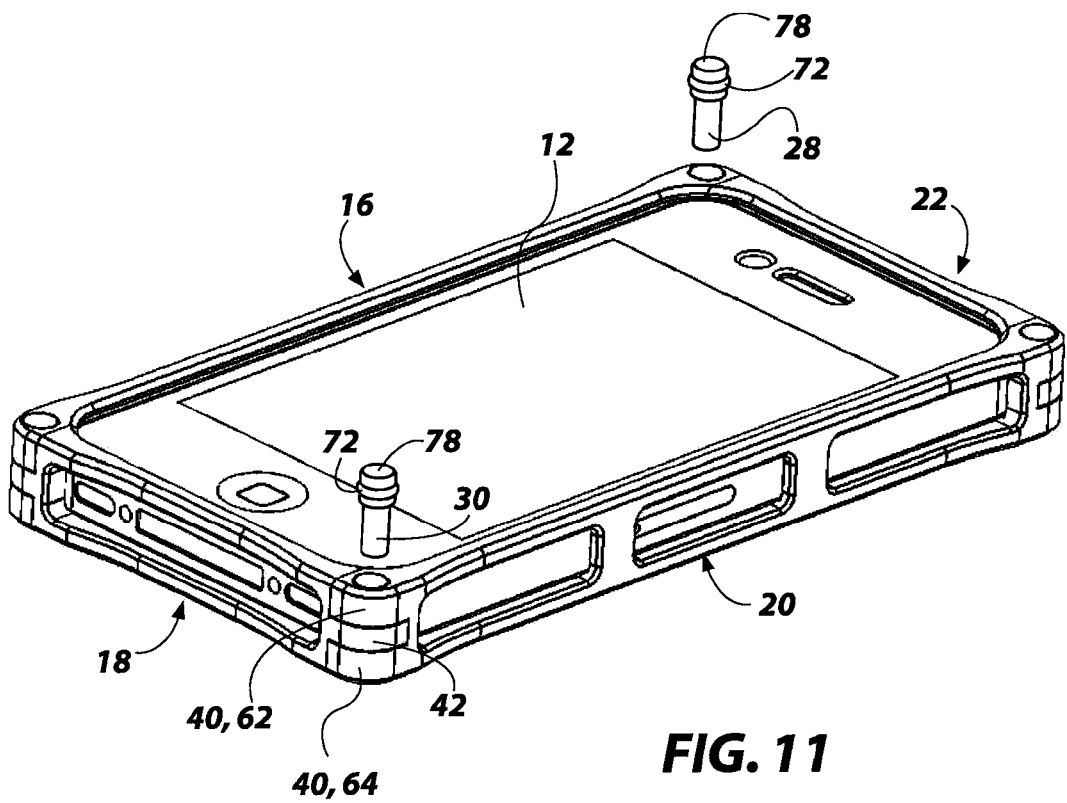
FIG. 11 is an isometric view of the first and fourth frame members of the protective case of FIG. 2 coupled together to form a third lap joint and the second and third frame members of the protective case of FIG. 2 coupled together to from a fourth lap joint.

The frame members 16, 18, 20, 24 may then be positioned around the portable electronic device, as shown in FIG. 10. The openings 54 of the frame members 16, 18, 20, 24 may be positioned to provide access to controls and features of the mobile electronic device 12, such as buttons, switches, adapters, microphones, speakers, inputs, and outputs. The top rails 44 may then be positioned so that a portion of the top rails 44 may overlap a portion of a top surface of the mobile electronic device 12. Similarly, the bottom rails 46 may be positioned so that a portion of the bottom rails 46 overlap a portion of a bottom surface of the mobile electronic device 12, as shown in FIG. 11. The first frame member 16 and the fourth frame member 22 may then be coupled together and the second frame member 18 and the third frame member 20 may be coupled together.

To join the first frame 16 member to the fourth frame member 22, the fingers 40 at a second end 50 of the first frame member 16 may be overlapped with the finger 42 extending from a second end 50 of the fourth frame member 22 and the apertures 56, 58, 60 within the fingers 40, 42 may be coaxially aligned to form the third lap joint 36, as shown in FIG. 11. The third pin 28 may then be coaxially aligned with the apertures 56, 58, 60 within the fingers 40, 42 and an axial force may be applied to the top surface 78 of the third pin 28 to push the third pin 28 into the coaxially aligned apertures 56, 58, 60 of the third lap joint 36 to lock the third lap joint 36 together. Because only an axial force is required, and no rotational force is required, to insert the third pin 28 into the third lap joint 36, the third pin 28 may be manually inserted, such as by a user's finger tip, without the use of any tools. As the third pin 28 is inserted into the into the third lap joint 36, the O-ring 72 positioned within the circumferentially extending recess 70 of the third pin 28 may be compressed between the wall 86 of the aperture 56 and the circumferentially extending recess 70 of the third pin 28, as shown in FIG. 7. Upon complete insertion, the radially extending surface 82 between the first axial region 66 and the second axial region 68 of the third pin 28 may contact the upper surface 84 of the finger 42 of the fourth frame member 22, which may align the top surface 78 of the third pin 28 with the surface 80 of the top rail 44 of the first frame member 16 and align the bottom surface 74 of the third pin 28 with the surface 76 of the bottom rail 46 of the first frame member 16.

Similarly, the fingers 40 at a second end 50 of the third frame member 20 may be overlapped with the finger 42 extending from a second end 50 of the second frame member 18 and the apertures 56, 58, 60 within the fingers 40, 42 may be coaxially aligned to form the fourth lap joint 38, as shown in FIG. 11. A fourth pin 30 may then be coaxially aligned with the apertures 56, 58, 60 within the fingers 40, 42 and an axial force may be applied to the top surface 78 of the fourth pin 30 to push the fourth pin 30 into the coaxially aligned apertures 56, 58, 60 of the fourth lap joint 38 to lock the fourth lap joint 38 together. Because only an axial force is required, and no rotational force is required, to insert the fourth pin 30 into the fourth lap joint 38, the fourth pin 30 may be manually inserted, such as by a user's finger tip, without the use of any tools. As the fourth pin 30 is inserted into the fourth lap joint 38, the O-ring 72 positioned within the circumferentially extending recess 70 of the fourth pin 30 may be compressed between the wall 86 of the aperture 56 and the circumferentially extending recess 70 of the fourth pin 30, as shown in FIG. 7. Upon complete insertion, the radially extending surface 82 between the first axial region 66 and the second axial region 68 of the fourth pin 30 may contact the upper surface 84 of the finger 42 of the second frame member 18, which may align the top surface 78 of the fourth pin 30 with the surface 80 of the top rail 44 of the third frame member 20 and align the bottom surface 74 of the fourth pin 30 with the surface 76 of the bottom rail 46 of the third frame member 20. The protective case 14 is then fully installed onto the mobile electronic device 12, as shown in FIG. 1. In view of the foregoing, the protective case 14 may be installed on the mobile electronic device 12 without the use of any tools.

After the protective case 14 has been installed, a user may desire to remove the protective case 14 from the mobile electronic device 12, such as to remove the battery from the mobile electronic device 12. The pins 24, 26, 28, 30 may be removed from each of the respective lap joints 32, 34, 36, 38 by applying an axial force to the bottom surface 74 of each pin 24, 26, 28, 30 that is sufficient to overcome the friction provided by the compressed O-ring 72. The axial force may be applied to the bottom surface 74 of the pin 24, 26, 28, 30 by a fine-tipped instrument, which does not need to be a specialized tool, such as a screwdriver or a hex wrench, as no rotation of the pin 24, 26, 28, 30 is required to remove the pin 24, 26, 28, 30 from the lap joint 32, 34, 36, 38. In view of this, one or more of a toothpick, a paper clip, a ball-point pen, and another fine-tipped instrument may be utilized to apply sufficient axial force to the bottom surface 74 of the pin 24, 26, 28, 30 and remove the pin 24, 26, 28, 30 from the lap joint 3 2, 34, 36, 38. As a specialized tool is not required to remove the protective case 14 from the mobile electronic device 12, a user may find a suitable fine-tipped instrument to remove the protective case 14 from the mobile electronic device 12, even if the user is in a remote location without access to specialized tools.

Removing only two pins 24, 26, 28, 30 may allow a user to remove the protective case 14 from the mobile electronic device 12. For example, a user may apply an axial force to the bottom surface 74 of the first pin 24 with a fine-tipped instrument to unlock the first lap joint 32 connecting the first frame member 16 to the second frame member 18. The user may then apply an axial force to the bottom surface 74 of the second pin 26 with the fine-tipped instrument to unlock the second lap joint 34 connecting the third frame member 20 to the fourth frame member 22 and the protective case 14 may be removed from the mobile electronic device 12.

The sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method of providing a protective case for a mobile electronic device, the method comprising:
   overlapping fingers extending from respective ends of a first frame member and a second frame member, the first frame member comprising a first aperture and a second aperture, the first and second apertures being aligned with each other, the first aperture having a first inner diameter, the second aperture having a second inner diameter, the first inner diameter being different than the second inner diameter, the second frame member comprising a third aperture;
   coaxially aligning the first, second, and third apertures of the first and second frame members within the fingers of the first and second frame members;
   applying an axial force to a first pin and pushing the first pin into the first, second, and third apertures with the axial force, the first pin comprising a first axial region having a first axial region diameter and a second axial region having a second axial region diameter, the first axial region diameter being different than the second axial region diameter, the first axial region being positioned in the first aperture and the second axial region being positioned in the second and third apertures; and
   compressing an elastic material between a radially internal surface of the first aperture and the first axial region of the first pin.

2. The method of claim 1, further comprising positioning the elastic material within a circumferentially extending recess of the first pin.

3. The method of claim 2, wherein positioning the elastic material at least partially within the circumferentially extending recess of the first pin comprises positioning an O-ring at least partially within the circumferentially extending recess of the first pin.

4. The method of claim 1, further comprising applying the axial force to the first pin manually and without a tool.

5. The method of claim 1, further comprising:
   overlapping fingers extending from respective ends of a third frame member and a fourth frame member;
   coaxially aligning apertures within the fingers of the third frame member and fourth frame member;
   applying an axial force to a second pin and pushing the second pin into the coaxially aligned apertures of the fingers of the third frame member and fourth frame member; and
   compressing an elastic material between a wall of an aperture of the coaxially aligned apertures of the fingers of the third frame member and fourth frame member and the second pin.

6. The method of claim 5, further comprising removing the protective case from the mobile electronic device by:
   removing the first pin from the coaxially aligned apertures of the fingers of the first frame member and second frame member by applying an axial force to the first pin with a tip of a fine-tipped instrument, the tip being configured to push the first or second pin through the coaxially aligned apertures; and removing the second pin from the coaxially aligned apertures of the fingers of the third frame member and fourth frame member by applying an axial force to the second pin with the tip of the fine-tipped instrument.

7. The method of claim 6, wherein:

applying the axial force to the first pin with the tip of the fine-tipped instrument comprises applying the axial force to the first pin with at least one of a toothpick, a paper clip, and a ball-point pen; and applying the axial force to the second pin with the tip of the fine-tipped instrument comprises applying the axial force to the second pin with at least one of a toothpick, a paper clip, and a ball-point pen.

\* \* \* \* \*